United States Patent [19]

Powers

[11] 3,816,233
[45] June 11, 1974

[54] MANUFACTURE OF URETHANE FOAM SHEETS
[75] Inventor: William R. Powers, Penns Grove, N.J.
[73] Assignee: Specialty Converters, Inc., Newark, Del.
[22] Filed: Dec. 14, 1972
[21] Appl. No.: 315,016

Related U.S. Application Data
[63] Continuation of Ser. No. 77,115, Oct. 1, 1970, abandoned.

[52] U.S. Cl. .................. 161/159, 161/160, 161/166, 161/190, 264/48, 264/54, 264/321, 264/DIG. 14
[51] Int. Cl. ........ B32b 5/14, B32b 5/20, B32b 3/26
[58] Field of Search ........ 264/48, 54, 321, DIG. 14; 161/159, 160, 190, 166

[56] References Cited
UNITED STATES PATENTS

| | | | |
|---|---|---|---|
| 2,908,943 | 10/1959 | Miller | 161/190 |
| 3,306,967 | 2/1967 | Turkewitsch | 161/190 |
| 3,328,225 | 6/1967 | Urbanic et al. | 161/190 |
| 3,384,531 | 5/1968 | Parrish | 161/159 |
| 3,391,051 | 7/1968 | Ehrenfreund et al. | 161/160 |
| 3,396,419 | 8/1968 | Richter et al. | 161/159 |

Primary Examiner—William J. Van Balen
Attorney, Agent, or Firm—Pennie & Edmonds

[57] ABSTRACT

This invention relates to a novel, porous integral polyurethane sheet wherein one side of the sheet, is of a high density, porous structure and the body of the sheet is a low density, open cell urethane foam. The invention provides a method of making such sheet which comprises differentially heating at least one side of a cast sheet of polyurethane foam mix relative to the body thereof during expansion, then compressing the expanded differentially heated, partially cured foam structure to achieve differential compression and a high density structure on the heated side.

6 Claims, 2 Drawing Figures

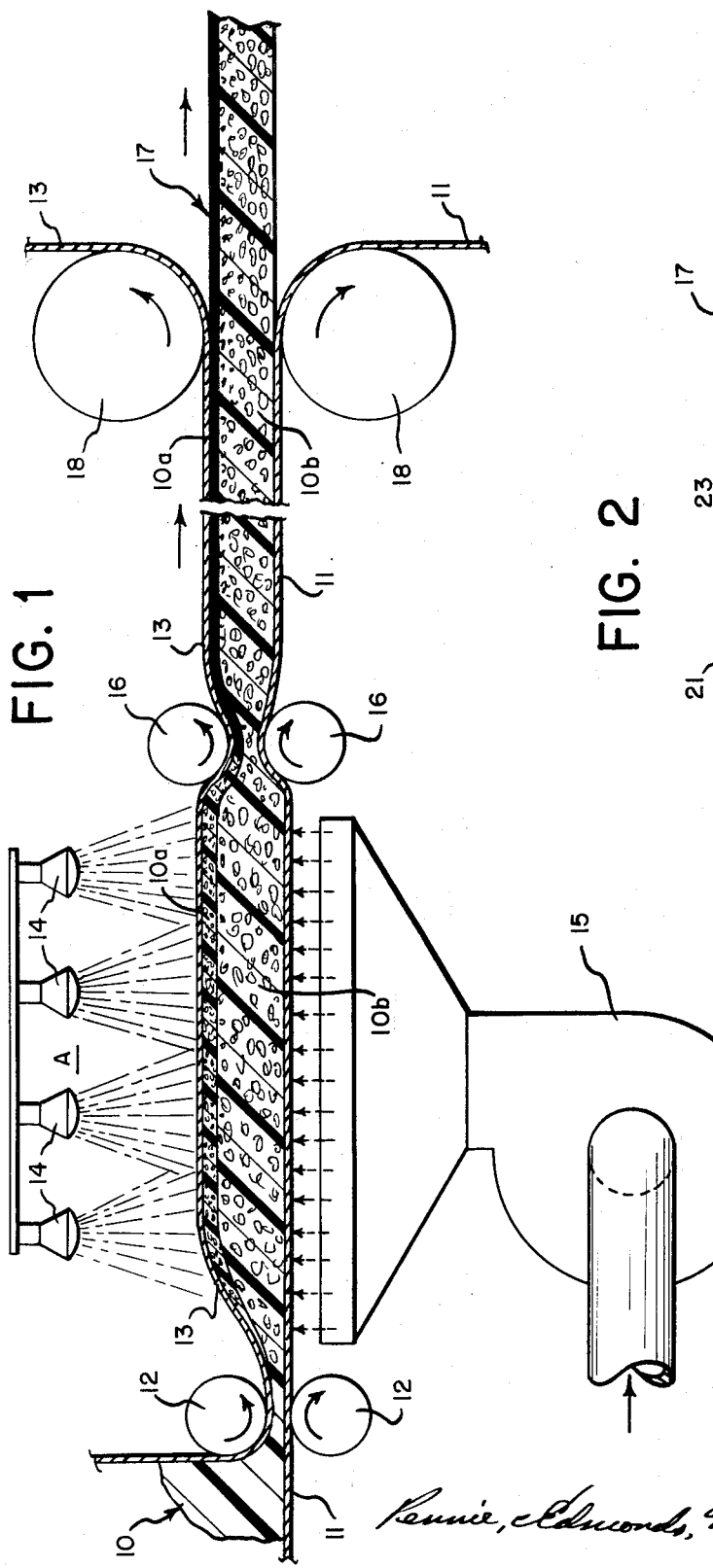

MANUFACTURE OF URETHANE FOAM SHEETS

This is a continuation, of application Ser. No. 77,115 filed Oct. 1, 1970, which is now abandoned.

BACKGROUND OF THE INVENTION

Cellular polyurethane is used for a variety of purposes including uses where a high degree of abrasion resistance is required. In many such uses not only a high degree of abrasion resistance but also "breathability" (easy permeability to the passage of air and water vapor) has been a much sought after goal. Applications where a combination of abrasion resistance and permeability is highly desired include shell fabric for outerwear, upholstery fabric, shoe uppers, acoustical wall covering, and porous conveyor belting.

Numerous methods for producing an abrasion resistant, non-porous skin or cellular polyurethane have been proposed. These include passing a cured urethane foam sheet under a hot knife or hot roll to cause melting and consolidation of the surface, and molding urethane foam compositions (having incorporated therein a volatile blowing agent) inside a mold having chilled surfaces which prevents volatilization of the blowing agent adjacent to the chilled surface and consequently leads to molded articles with a skin surface. However, in all cases the resulting skins are non-porous and no breathability is attained.

The object of the present invention is to provide a cellular urethane having a skin which is both abrasion resistant and highly porous. A second object is to provide an inexpensive and convenient process for manufacturing these products.

SUMMARY OF THE INVENTION

It has now been found that it is possible to make foamed polyurethane sheets having a dense yet gas-permeable structure on one side in a continuous manner. The high density structure advantageously is in the form of a distinct skin integral with the low density body of the sheet. These sheets may be any of a wide variety of thicknesses, levels of resiliency, strength, elongation and tear resistance, while the skin surface may be exceedingly thin (5 mils or even less) or as thick as 50 or even 100 mils. Further, the permeable skin surface may be exceedingly dense, i.e. have a void volume of only 10–20 percent per unit volume of skin foam, or it may have any lesser density ranging up to a void volume of 75–85 percent; but in general the density of the skin layer is at least twice that of the body of the sheet.

Briefly stated, the invention provides an improved method for making an integral gas-permeable foamed polyurethane sheet, the density of which adjacent one side thereof is substantially greater than the density of the body of the sheet, which comprises a. casting a foamable liquid urethane resin mixture into the form of a thin sheet,
b. heating one side of the sheet while maintaining the body of the sheet at a relatively cool temperature until the sheet has foamed substantially and has become partially cured,
c. compressing the partially cured foamed sheet while it is thus differentially heated to collapse the foam on the heated side thereof,
d. releasing the sheet from compression,
e. and thereafter completing curing of the sheet.

Preferably, the sheet is heated on one side while it is maintained relatively cool on the opposite side. In this manner a sheet having a distinct integral skin of high density on one side backed by a low density foam body layer defining the opposite side of the sheet may be produced. Or, by this means, a sheet having a density which increases from one side to the other, but without a distinct skin, can be produced. If both sides of the sheet are heated while the central body portion is kept relatively cool, a sheet of high density on both sides and relatively low density in the center can be made.

The invention further provides an integral gas permeable foamed polyurethane sheet the density of which adjacent one side is substantially greater than the density of the body of the sheet (the body of the sheet may be its central portion intermediate the two surfaces, or it may define one such surface). Such sheet is characterized by having mainly very small cells (or voids) of generally elongated form adjacent its high density side and having mainly relatively large substantially isometric cells in its body portion, the density of the sheet adjacent its high density side being at least about twice the density thereof in its body portion.

A preferred product according to the invention is a gas permeable foamed polyurethane sheet having a skin layer of substantial thickness at one face thereof integral with a foamed main body layer, said skin layer being a foam having a density at least twice that of the body layer, said skin layer being characterized by having its cells deformed to a flattened shape such that the cell dimension normal to the plane of the sheet is substantially less than (generally substantially less than half) the average dimension of the cell measured in the plane of the sheet, the cells of the body layer of foam being substantially isometric.

BRIEF DESCRIPTION OF THE DRAWING

The new product and process will be better understood from the following description thereof in conjunction with the accompanying drawings, wherein:

FIG. 1 is an elevational view, partly in section and partly broken away, illustrative of the sequence of steps employed in carrying out the method; and FIG. 2 is a cross-sectional view of a foamed sheet product of the present invention.

DETAILED DESCRIPTION

As to materials, the components to be used in the method can be any of those commonly employed to make flexible polyurethane foams. The particular composition employed can vary widely depending upon the particular density, tensile strength, elongation, tear strength, solvent resistance, flexibility, cell size and other properties desired. Selection of particular components to give desired end properties has been broadly discussed in the literature and in prior patent art.

Broadly, polyurethane foams are produced by reacting a substance having two or more active hydrogen atoms (as determined by the Zerewitinoff method) in the presence of small amounts of water with an organic polyisocyanate. Carbon dioxide evolved by the reaction between the isocyanate and water causes foaming while the simultaneous reaction between isocyanate and the substance containing active hydrogens results in chain extension and polymerization. In practical foam systems, catalysts, foam stabilizers, pigments, fillers and volatile liquids which serve as auxiliary blowing agents are often also present in a foamable urethane mix.

Referring to FIG. 1, a foamable composition 10 as set forth above is dispensed in the conventional manner onto a carrier web or belt 11. The composition 10 passes between metering rolls 12 which act to spread the composition into a uniform layer of desired thickness.

Emerging from the rolls now confined between the carrier belt 11 and top cover web or sheet 13 the composition is conveyed beyond the rolls 12 to an area A. In this area the upper surface of the composition is heated by heating the cover sheet 13 by means of infrared radiation provided by lamps 14. The bottom surface of the composition is maintained at a lower temperature as desired by means of cooling air at a suitable temperature supplied by blower 15.

During this step of the process the entire foam mass expands into a low density foam. The upper surface portion 10a of the foam composition 10 becomes quite hot owing to the combined effect of the heating lamps plus the heat liberated by the exothermic foaming and polymerization reactions. The lower portion 10b of the foam composition, on the other hand, is maintained at a lower temperature as the air flows past the surface of the bottom carrier belt 11 and extracts exothermic heat from the composition.

The temperature differential established during the differential heating of opposite sides of the composition should be at least about 75° F. That is, the maximum temperature of the foam composition on the heated side, under the cover web, should be at least about 75° F., and advantageously 100° F., above the minimum temperature of the foam composition on the cooled side, under the carrier web, by the time the advancing webs have carried the composition to the end of the treatment zone A. However, if a foam graded from one side to the other in density, but without a distinct skin layer, is desired, then the temperature differential may be substantially less than 75° F.; it may, in such case, be from 25° to 75° F. In general, for producing a foam having a distinct skin, it is desirable to heat the composition on the upper (heated) side to a temperature in the range from 125° to 250° F., while maintaining the temperature on the cooled (lower) side below 120° F. Preferably the heated side is brought to a temperature from 175° to 200° F., while the opposite side is held in the range from 80° to 120° F.

After the foaming reaction is substantially complete the partially polymerized and differentially heated foam composition 10 is passed between compression rolls 16 which compress the composition to a fraction of its previous thickness. Upon being compressed the hot, soft, plastic foamed upper layer 10a of the composition is permanently collapsed into a high density, yet porous skin, while the cooler, resilient bottom layer 10b of the foamed composition is only temporarily deformed by the compression treatment and substantially re-expands into a low density foam structure.

On leaving the compression stage the composition is maintained between the carrier sheets for sufficient time to allow polymerization to proceed to a point where the composition is strong enough to permit easy handling. The carrier belt 11 and top sheet 13 are then stripped from the foamed sheet around rolls 18, and the foamed cured polyurethane sheet having a porous skinned upper surface is removed from the treatment area in the usual manner, as by a pickup roll (not shown).

Instead of stripping the carrier and cover sheets from the foam sheet, one or both of these may be a web of any desired material which is to be laminated to one or both surfaces of the foam sheet. Such web is then left adhesively bonded, by the adhesive character of the polyurethane, to the foam sheet.

The foam product produced by the above method is illustrated in FIG. 2. There is shown a representative section of foamed sheet comprising a porous high density skin 21 and integral therewith a relatively low density foam body 22. The cells of the skin 21 are severely flattened so as to have dimensions on their X and Y axes (longitudinally and transversely of the sheet parallel to the plane of the sheet) increased and on their Z axes (normal to plane of the sheet) much decreased as compared with the cells of the foam body 22, these latter cells being substantially isometric. On the average, the maximum dimension on the Z axis of the skin cells is substantially less than half the average diameter of the body layer cells.

The density of the skin layer is markedly greater than that of the body layer. In general the skin density is at least twice that of the body layer, and it may be much more, up to 20 or more times greater than the body layer density. Conversely, the void volume of the skin layer is low relative to that of the foam layer. For example, skin void volume may be as low as 10 to 20 percent of the total skin volume, or as high as 75 percent or more. In contrast, the void volume of the body layer typically is in the range from 90 to 97 percent of its total volume, although it may be more or less.

The thickness of the skin layer generally is substantial. Typically it ranges from about 0.003 inch to 0.075 inch or more. The skin in general will account for 10 to 60 percent of the total thickness of the foamed sheet. However, it is possible to make products with skins that are thinner or substantially thicker, or accounting for a lesser or greater proportion of total sheet thickness, than would fall within these ranges.

The phenomenon encountered when a foamable urethane mix is expanded under conditions of differential heating is surprising and unexpected. It is well known that high temperatures accelerate organic reactions, and this is known to be so in the reaction of an isocyanate with a substance containing an active hydrogen. One would therefore expect the hot upper surface of a foaming composition to be more extensively polymerized than the cooler bottom surface. Indeed, this must be so; therefore, one would expect the upper surface to exhibit properties more toward those of a fully cured product (e.g. elasticity) than would be expected of the bottom, less cured surface. While I do not wish to be bound by the following attempt to explain this phenomenon, I believe that the surprising collapse of the hot, more fully cured upper layer of a foam composition in my process is due to the fact that partially cured polyurethanes are quite thermoplastic. Thus the hot upper surface, even though more completely polymerized than the bottom surface, is rendered soft and plastic by the high temperature; whereas the cooler bottom surface, in spite of its lesser degree of polymerization, is more or less elastic because of the lower temperature.

As to operating conditions, these may vary over a wide range depending upon the foaming composition employed and the thickness and density of the skin desired. As is well known in the art, the rate of the foaming reaction and polymerization reaction in the production of a polyurethane foam may be broadly varied by choice and concentration of the catalyst or catalysts employed. Although general rules may be stated optimum conditions for a particular formulation must be determined by experiment.

Thick dense skins are produced if during the foaming stage of the reaction a temperature differential of at least 75° F. and preferably 100° F. or more is established between the surfaces of top and bottom broad faces at the time foam rise is completed and the heat is applied more or less uniformly during the entire foaming period.

Thin dense skins are produced if the heat is suddenly applied to the chosen surface during the last stages of the foam rise stage and a temperature differential of at least 75° and preferably 100° F. or more is established by the time foam rise is complete.

Lower temperature differentials (25° to 75° F., typically 50° F.) tend to yield products which show a density gradient across the thickness of the sheet, the density at the heated side being twice or more the density of the opposite side; but the density gradient is more or less uniform from one side to the other of the sheet and no distinct skin is produced.

The invention is further described in connection with the following examples which are set forth for purposes of illustration only:

EXAMPLE 1

This example describes the preparation of a polymeric polyester polyurethane foam sheet having a thick dense skin.

Into a closed container equipped with an agitator and means for maintaining a nitrogen gas sweep are charged at room temperature, 50 parts by weight of an approximately 80.20 isomeric mixture of toluene-2, 4-diisocyanate and toluene-2, 6-diisocyanate and 50 parts of an adipate polyester resin having a hydroxyl number of 53, an acid number of less than one, and a viscosity of 23,000 cps at 77° F.

The above mixture is agitated under a maintained nitrogen atmosphere, exotherming to approximately 85° F. and cooling to 70° F. over a period of 6 hours. The product is termed component A.

There are blended together at room temperature, 100 parts by weight of the polyester resin referred to above; 3.0 parts of water; 1.0 parts of n-ethyl morpholine; and 3.0 parts of a commercial foam stabilizer. This product is termed component B.

By means of a conventional urethane foam metering and dispensing apparatus components A and B were continuously metered, mixed and dispensed onto a moving carrier belt at a ratio of 112/100 parts by weight. The foamable mix was spread by means of rolls and upper sheet to form a uniform layer 20 mils thick. As the carrier belt passed beyond the metering rolls, it was kept cool (approximately 80°–90° F.) while the top sheet was heated by a plurality of radiant heaters. After 300 seconds the foam had risen to a height of 400 mils and the top sheet had a surface temperature of 180°–200° F. The carrier sheets, together with the foam mass was passed between heavy compression rolls set so as to compress the foam to a thickness of 40 mils. The compressed product still maintained between the carrier sheets was then heated to a temperature of approximately 225°–250° F. for a period of 10 minutes to complete the cure. It was then stripped away from between the carrier belt and top sheet.

Examination of the product showed it to be a foam product about 75 mils thick comprising a fine cell, low density foam layer about 50 mils thick and a dense skin layer about 25 mils thick. The skin was extremely porous; tested in a Gurley Permeometer it passed 100 ml. of air in 3 seconds. Scratched repeatedly with a small wire, the skin exhibited good resistance to abrasion.

EXAMPLE 2

This example also describes the preparation of a polymeric polyester polyurethane foam sheet having a thick dense skin.

The procedure of Example 1 was repeated except that the metering rolls were opened to permit a laydown 30 mils thick of a foamable mixture. The height of the foam after 300 seconds, but before compression, was 650 mils. After compression, between compression rolls set to a gap of 60 mils and curing, the product was about 175 mils thick comprising a low density foam layer about 145 mils thick and a dense skin layer about 30 mils thick. As in Example 1, the skin layer was highly porous.

EXAMPLE 3

This example describes the preparation of a polymeric polyester polyurethane foam sheet having a graded density across its thickness, but no skin.

The procedure of Example 1 was repeated except that the bottom carrier belt was gradually heated to a temperature of about 140° F. by means of steam pipes. After 180 seconds the foam had risen to a height of about 450–475 mils. After 360 seconds the foam was compressed between compression rolls set to a gap of 60 mils. After curing as in Example 1 the product was examined. No skin of significant thickness was visible; the foam structure ranged from a low density isometric cellular structure adjacent the bottom face to a compacted foam structure having many relatively small elongated cells adjacent the top face. Permeability was extremely high.

EXAMPLE 4

This example describes the preparation of a polymeric polyester polyurethane foam sheet having a thick skin by employing the so-called "one shot" process of foam making.

By means of a conventional urethane foam metering and dispensing apparatus there was deposited onto a moving carrier belt a foamable composition comprising a blend of the following feed streams:

Component A: 100 parts of adipate polyester
Component B: 37.5 parts of 80.20 isomeric mixture to toluene-2, 4-diisocyanate and toluene-2, 6-diisocyanate.
Component C: A blend of: 2.8 parts water, 0.3 parts n-ethyl morpholine, 0.15 triethylene diamine, and 2.0 parts commercial foam stabilizer.

The foamable mix was spread by means of metering rolls and upper sheet to form a uniform layer 10 mils thick. As the carrier belt passed beyond the metering rolls it was gradually heated to a temperature of 130°–140° F. during a period of 120 seconds. During the same period the top cover sheet was gradually heated to a temperature of 225°–250° F. After the 180 second period during which the foam had completely risen to a height of about 260 mils the carrier and cover sheets, together with the expanded foam mass, was passed between heavy compression rolls set so as to compress the foam to a thickness of 25 mils. The compressed product still maintained between the carrier sheets was held at a temperature of 250°–275° F. for a period of 5 minutes to complete the cure. It was then stripped away from between the carrier belt and top sheet.

Examination of the product showed it to be a foam product about 42 mils thick comprising a low density foam layer about 30 mils thick and a dense skin layer about 10–12 mils thick. The skin was porous and abrasion resistant.

EXAMPLE 5

This example describes the preparation of a polymeric polyether polyurethane foam sheet having a dense porous skin.

By means of a conventional urethane foam metering and dispensing apparatus there was deposited onto a moving carrier belt a foamable composition comprising a blend of the following feed streams:

Component A: 100 parts of a toluene diisocyanate polyoxypropylene polyol prepolymer containing 9.4 percent free-NCO.

Component B: A blend of 2.0 parts water, 0.2 parts tetramethylbutane diamine, 0.2 parts triethylene diamine, and 0.5 parts silicone oil.

The foamable mix was spread by means of metering rolls between a carrier sheet and upper sheet to form a uniform layer 20 mils thick. As the carrier belt passed beyond the metering rolls it was gradually heated to a temperature of 120° F. during a period of 90 seconds. During the same period the top sheet was heated to a temperature of 220° F. After the 90 second period during which the foam had completely risen to a height of about 375 mils, the carrier and cover sheets together with the expanded foam mass was passed between heavy compression rolls set so as to compress the foam to a thickness of 35 mils. The compressed product still maintained between the carrier and cover sheets was held at a temperature of 250°–275° F. for a period of 5 minutes to complete the cure, after which the carrier and cover sheets were stripped away. Examination of the product showed it to be about 60–65 mils thick comprising a low density foam layer about 30 mils thick and a porous skin about 30–35 mils thick. While the skin was not so resistant to abrasion as the products prepared from the adipate polyester, it had sufficient resistance to permit use in many applications.

It will be evident from the foregoing that a variety of embodiments of the process are possible. While heating with radiant heat has been disclosed for the purpose of illustrating apparatus for carrying out the method, other types of heating, as for example forced hot air, may be conveniently employed. Likewise, by electing to apply the heat to the bottom surface of a sheet of foamable urethane mix instead of to the top surface, products with a relatively high density skin surface on the bottom side may easily be produced.

From the foregoing discussion it should be evident that by establishing a temperature differential on both broad surfaces of a foamable composition with respect to the temperature pertaining in the middle of the composition during the foaming step, it is possible to manufacture embodiments of the product which have a permeable dense skin on each surface and a lower density foam core.

By employing an embossed carrier sheet on the surface side which is to be compressed into the dense skin, products having embossed breathable skins may be produced.

Also contemplated are embodiments which are composite structures comprising the products of the invention adhered to a substrate. Thus, a material suitable for upholstery fabric or shoe uppers may be produced by laminating the products of this invention to a felt or fabric. Such composites may be produced by post laminating a product of this invention to a suitable substrate; alternatively, the foamable mix may be cast directly upon the substrate and employing the process of this invention a substrate/foam/porous skin composite may be manufactured in one step.

What is claimed is:

1. A single layer structure comprising a uniform integrally formed gas permeable foamed polyurethane sheet the density of which adjacent one side thereof is substantially greater than the density of the body of the sheet, characterized by having closed cells which are severely flattened along their axes normal to the plane of the sheet adjacent its high density side and having relatively large isometric cells in its body portion, the density of the sheet adjacent its high density side being at least about twice the density thereof in its body portion.

2. A uniform integral gas permeable foamed polyurethane sheet according to claim 1 wherein the cell volume is from about 25 percent to about 75 percent per unit volume of foam adjacent the high density side of the sheet and the cell volume is greater than 90 percent per unit volume of foam adjacent the body of the sheet.

3. A uniform integral gas permeable foamed polyurethane sheet according to claim 1 wherein the relatively low density body of the sheet forms the surface thereof opposite the high density side.

4. A gas permeable foamed uniform polyurethane sheet comprising a single layer structure having a skin of substantial thickness at at least one face thereof integrally formed with but distinct from a foamed main body, said skin being a foam having a density at least twice that of the body, said skin being characterized by having its closed cells deformed to a flattened shape such that the cell dimension normal to the plane of the sheet is substantially less than half the average dimension of the cells measured in the plane of the sheet, the cells of the body foam being substantially isometric.

5. A gas permeable foamed polyurethane sheet according to claim 4 wherein the skin has a thickness in the range from about 0.003 inch to 0.075 inch.

6. A gas permeable foamed polyurethane sheet according to claim 4 wherein the skin constitutes from 10 to 60 percent of the total thickness of the sheet.

* * * * *